United States Patent
Yato

(10) Patent No.: US 9,906,184 B2
(45) Date of Patent: Feb. 27, 2018

(54) CONTROL APPARATUS OF MOTOR

(71) Applicant: OKUMA Corporation, Niwa-gun, Aichi (JP)

(72) Inventor: Takahiko Yato, Aichi (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 286 days.

(21) Appl. No.: 14/956,795

(22) Filed: Dec. 2, 2015

(65) Prior Publication Data
US 2016/0156301 A1     Jun. 2, 2016

(30) Foreign Application Priority Data
Dec. 2, 2014     (JP) .................................. 2014-244265

(51) Int. Cl.
| | |
|---|---|
| *G01K 1/00* | (2006.01) |
| *H02P 29/00* | (2016.01) |
| *G01K 13/00* | (2006.01) |
| *G01K 7/00* | (2006.01) |
| *H02P 29/64* | (2016.01) |

(52) U.S. Cl.
CPC ............ *H02P 29/0055* (2013.01); *G01K 7/00* (2013.01); *G01K 13/00* (2013.01); *H02P 29/64* (2016.02)

(58) Field of Classification Search
USPC ........................................ 374/141, 152, 153
See application file for complete search history.

(56) References Cited

U.S. PATENT DOCUMENTS

| | | | | |
|---|---|---|---|---|
| 5,392,716 A | * | 2/1995 | Orschek ................. | B60L 3/12 |
| | | | | 105/49 |
| 7,815,368 B2 | * | 10/2010 | Sasaki ..................... | G01K 1/14 |
| | | | | 310/68 C |
| 8,061,893 B2 | * | 11/2011 | Su ....................... | G01R 31/343 |
| | | | | 318/490 |
| 8,967,857 B2 | * | 3/2015 | Senoo ..................... | G01K 13/00 |
| | | | | 322/51 |

FOREIGN PATENT DOCUMENTS

| | | |
|---|---|---|
| JP | 2004090683 A | 3/2004 |
| JP | 2008113477 A | 5/2008 |

* cited by examiner

*Primary Examiner* — Mirellys Jagan
(74) *Attorney, Agent, or Firm* — Cantor Colburn LLP

(57) ABSTRACT

A temperature detection element that detects a temperature of a detector is provided in a detector that detects a rotational position and/or a rotational speed of a rotor of a motor. An estimated value of a change of a wiring temperature is calculated based on a current supplied to the wiring of the motor. An estimated value of a change of the detector temperature is calculated based on the estimated value of the change of the wiring temperature. A difference between the detector temperature detected by the temperature detection element and the estimated value of the change of the detector temperature is set as an environmental temperature. The environmental temperature is added to the estimated value of the change of the wiring temperature, to estimate an absolute value of the wiring temperature. The wiring temperature is monitored based on the estimated absolute value of the wiring temperature.

3 Claims, 9 Drawing Sheets

CONTROL APPARATUS OF MOTOR

CROSS REFERENCE TO RELATED APPLICATIONS

The application claims priority to Japanese Patent Application No. 2014-244265 filed on Dec. 2, 2014, which is incorporated herein by reference in its entirety.

BACKGROUND

Technical Field

The present invention relates to a control apparatus of a motor which drives a feed shaft, a spindle, or the like in a machine such as a machine tool, and in particular, to monitoring of a temperature of wiring of the motor.

Related Art

In many motors, as disclosed in Japanese Patent No. 4135437, a wiring temperature detection element 7 such as a thermostat and a thermistor is provided at a coil end 3 of a wiring of a stator 6 (FIG. 1). A wiring temperature is monitored by these temperature detection elements, and when the temperature becomes a particular temperature, a current to the motor is limited or electricity application is discontinued, to protect the wiring from burnout.

This method ensures reliable protection because the temperature of the wiring can be directly monitored. In addition, because the electricity application can be continued until the temperature of the motor becomes a temperature very close to the heat resistant temperature of the motor, the characteristic of the motor can be utilized to a maximum degree.

In addition to the above, other methods of burnout protection of the wiring are known such as that shown in JP 2008-113477 A in which the temperature detection element is not used, a change of the wiring temperature is estimated based on a current during driving of the motor or a torque command value which is in a proportional relationship with the current, and the current to the motor is limited or the electricity application is discontinued when the estimated value becomes a particular value.

As this method does not use the temperature detection element, the method is advantageous in cases where the temperature detection element cannot be provided because there is no spatial margin in the structure of the motor or where the cost is to be reduced.

The method of estimating the change of the wiring temperature may be represented by a simple model as shown in a block diagram of FIG. 2. The estimation equation is represented by the following equation:

$$\Delta T'(n) = \beta \times \{(\alpha \times T\mathrm{in})^2 - \Delta T'(n-1)\} + \Delta T'(n-1) \quad \text{(Equation 1)}$$

Here, $\Delta T'$ represents an estimated value of the change of the wiring temperature, $\alpha$ represents a coefficient which determines a saturated value of the estimated value of the change of the wiring temperature, $\beta$ represents a coefficient which determines a time constant of the estimated value of the change of the wiring temperature, and $T\mathrm{in}$ represents a command value or detected value of a current or a torque command value which is in a proportional relationship with the current. The index (n) represents the number of detection periods. That is, $\Delta T'(n)$ represents the estimated value of the change of the wiring temperature at an nth detection period. Equation 1 corresponds to a wiring temperature change estimation unit 20 of FIG. 2. Equation 1 is an equation for calculating the estimated value of the change of the wiring temperature at the nth detection period based on the estimated value of the change of the wiring temperature at an (n−1)th detection period and the current command value or the like.

A relationship between $\Delta T'$ which is an estimated value and $\Delta T$ which is the actual change of the wiring temperature is shown in FIG. 3. When $\beta$ is adjusted, a slope of $\Delta T'$ changes as shown by reference numeral 70, and when $\alpha$ is adjusted, an upper limit value of $\Delta T'$ changes as shown by reference numeral 71. By adjusting these two parameters, it becomes possible to calculate the estimated value adapted for the thermal characteristic for each motor type. Tin is squared because the model calculates an amount of generated heat due to copper loss calculated by (square of current)×(resistance).

In the method of providing the temperature detection element on the wiring as described above, the motor must be designed in consideration of the space for placing the temperature detection element and a wiring method. In addition, an additional cost would be required for adding the temperature detection element. For these reasons, the method is not suited for small-size, low-cost motors.

In the method of estimating the change of the wiring temperature based on the current during driving of the motor or the like without the use of the temperature detection element, the temperature of the wiring cannot be known as an absolute value. Normally, a threshold for discontinuing the electricity is set assuming a state of a high environmental temperature.

Specifically, when a heat resistance temperature of the wiring of the motor is assumed to be 140° C. and the maximum environmental temperature is assumed to be 40° C., the motor is designed such that the electricity application is discontinued when the temperature is increased by 100° C. (=140° C.−40° C.).

When the motor is designed in the above-described manner, when the actual environmental temperature is 20° C., the temperature where the wiring temperature is increased by 100° C. and the electricity application is to be discontinued is 120° C. (=20° C.+100° C.). In other words, the electricity application is discontinued in a state where there still is a margin of 20° C. for the wiring of the motor (refer to FIG. 4).

On the other hand, when the motor is used in a situation with the actual environmental temperature of 60° C., the electricity application is not discontinued until the actual wiring temperature is increased from 60° C. by 100° C., that is, to 160° C. (=60° C.+100° C.). Because of this, the temperature exceeds 140° C., which is the original intended temperature where the protection operation is to be started, by 20° C. (refer to FIG. 5), which results in possibility of damage to the wiring and failure of the motor.

In order to solve these problems, the wiring temperature must be monitored as an absolute value corresponding to the actual temperature, and not as the change from a certain unknown temperature. In addition, it is necessary that the absolute value not be obtained directly from the wiring temperature, but be estimated from other physical parameters.

SUMMARY

According to one aspect of the present invention, there is provided a control apparatus of a motor, comprising: a detector that detects a rotational position and/or a rotational speed of a rotor of a motor, and that has a temperature detection element that detects a temperature of the detector; a circuit that estimate a change of a wiring temperature, to calculate an estimated value of the change of the wiring temperature; a circuit that estimates a change of a detector temperature based on the estimated value of the change of the wiring temperature, to calculate an estimated value of the change of the detector temperature; a circuit that subtracts the estimated value of the change of the detector temperature from an absolute value of the detector temperature detected by the temperature detection element, to calculate an environmental temperature; and a circuit that adds the obtained environmental temperature to the estimated value of the change of the wiring temperature, to calculate an estimated value of an absolute value of the wiring temperature.

According to the motor control apparatus of various aspects of the present invention the following advantage can be obtained. Normally, in order to detect the wiring temperature of the motor as an absolute value, a temperature detection element for detecting the wiring temperature is necessary. On the other hand, when the absolute value of the wiring temperature is to be determined by calculation, without providing the temperature detection element for detecting the wiring temperature, because it is not possible to take into consideration the environmental temperature, only the change of the wiring temperature can be estimated. By calculating the environmental temperature using the absolute value of the temperature of the detector measured by a detector temperature detection element provided in the detector for detecting the rotational position and/or rotational speed of the rotor, it becomes possible to estimate the wiring temperature of the motor as an absolute value without using the temperature detection element for detecting the wiring temperature.

DESCRIPTION OF EXEMPLARY EMBODIMENTS

Figure 1:
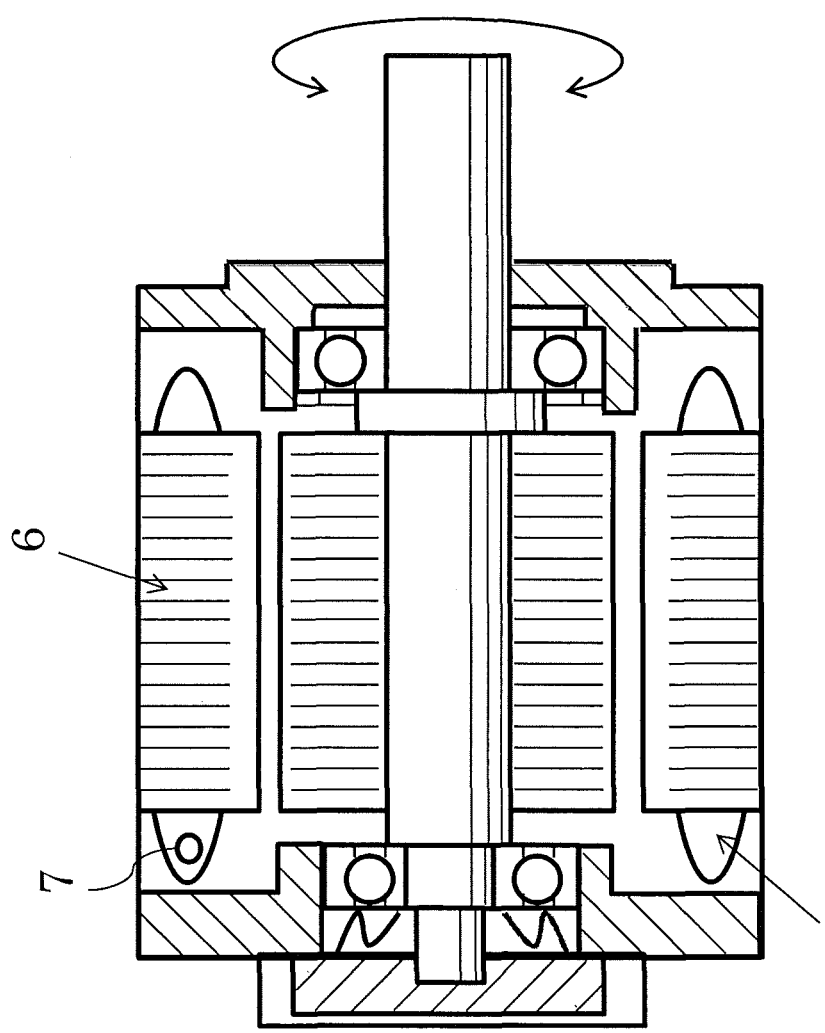
FIG. 1 is a structural diagram of a typical motor.
Figure 2:
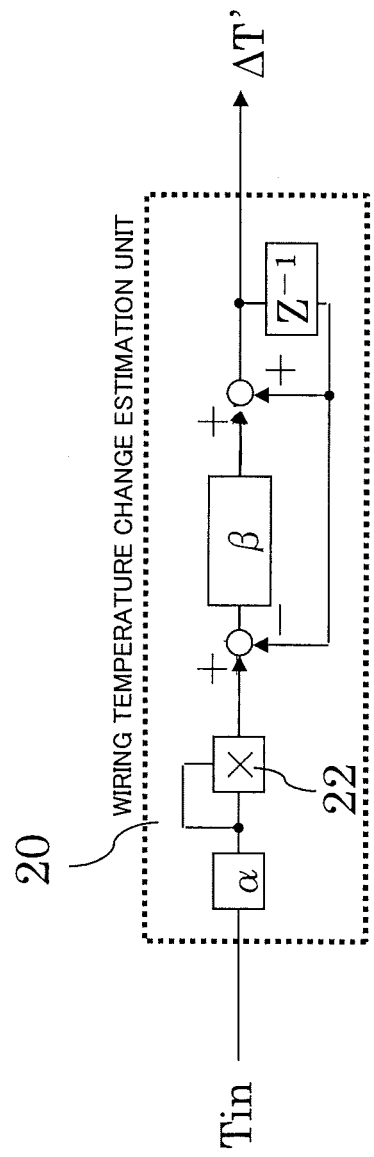
FIG. 2 is a functional block diagram of a circuit which estimates a change of a wiring temperature.
Figure 3:
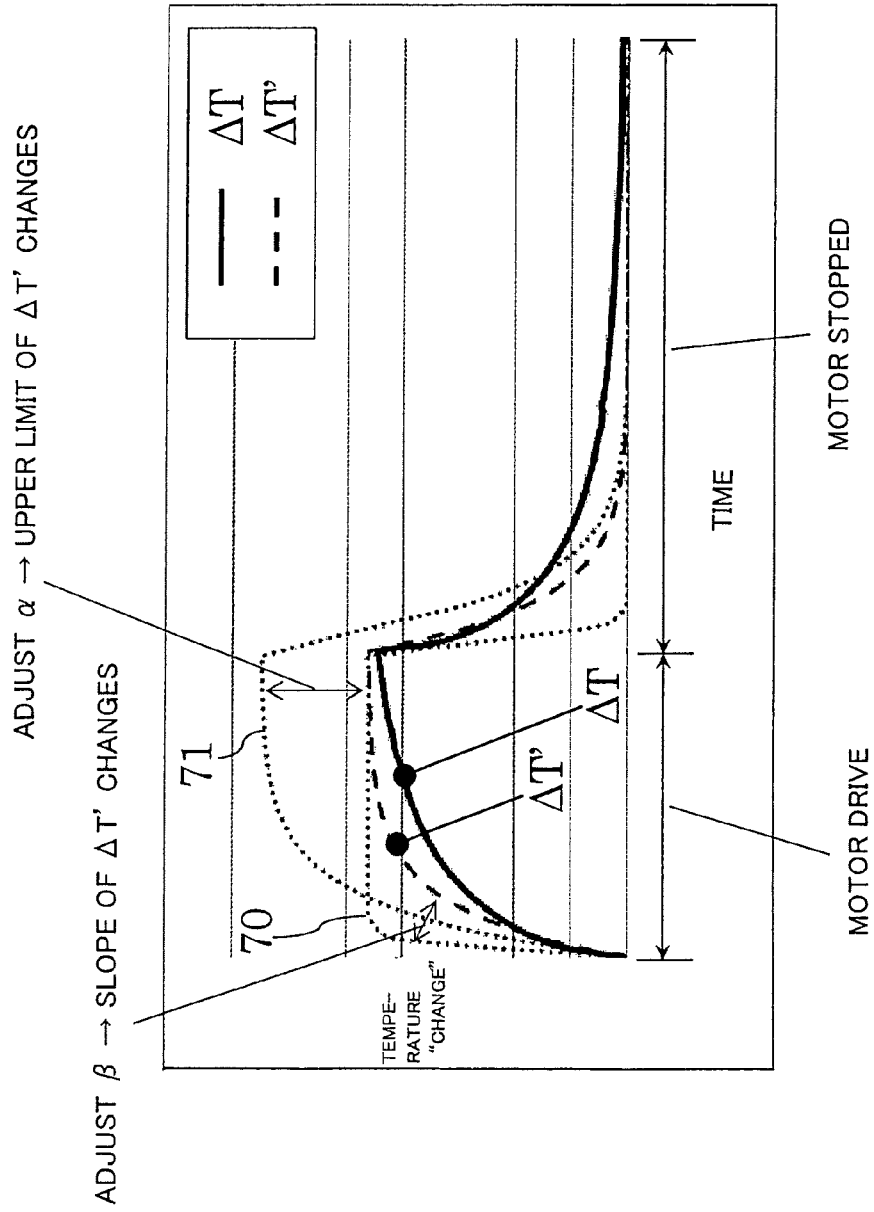
FIG. 3 is a diagram showing a relationship between an estimated value ΔT' of the change of the wiring temperature calculated by the circuit of FIG. 2 and an actual change ΔT of the wiring temperature.
Figure 4:
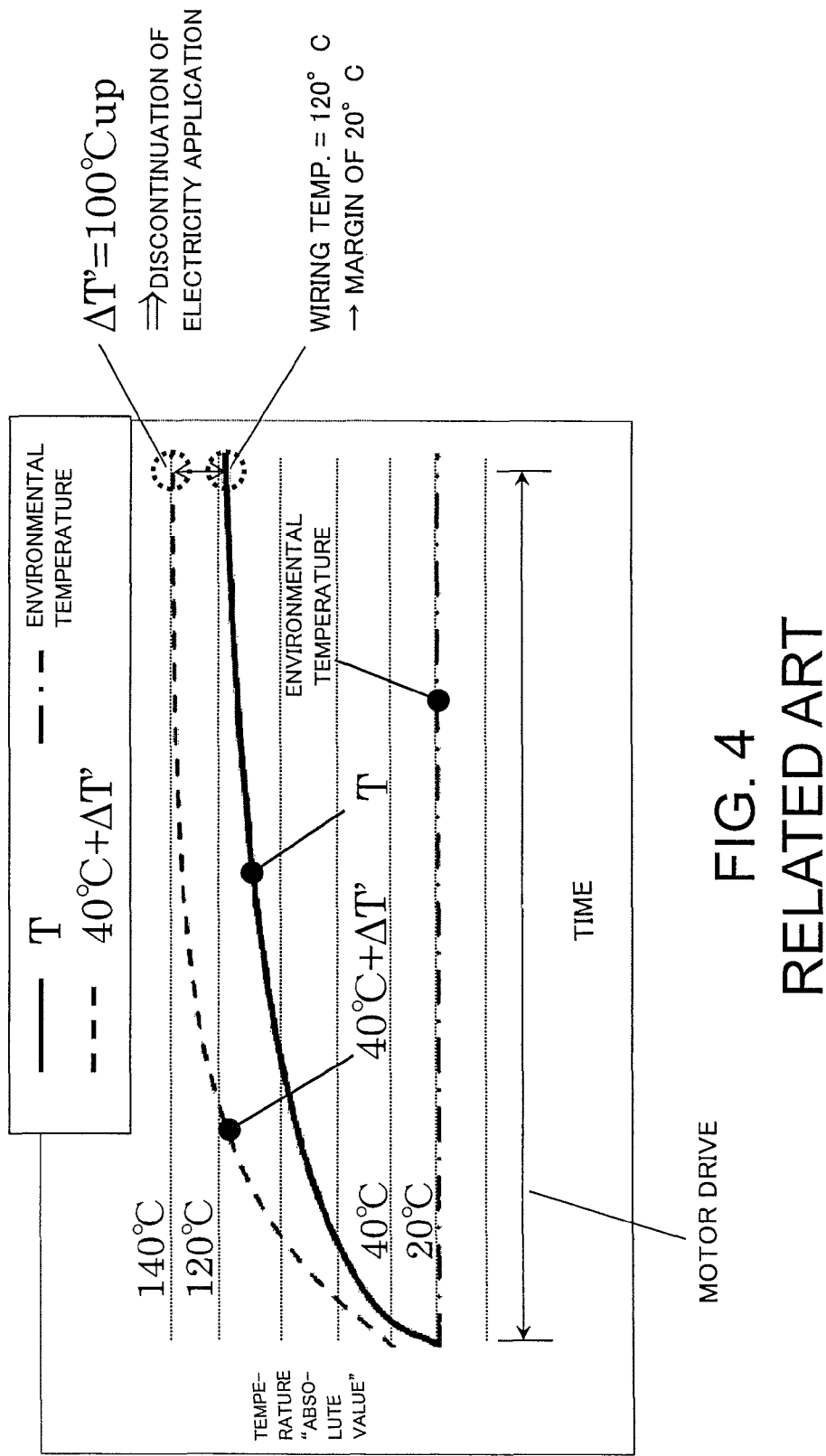
FIG. 4 is a diagram showing a relationship between an estimated value ΔT' of the change of the wiring temperature calculated by the circuit of FIG. 2 and an actual change ΔT of the wiring temperature when the environmental temperature is 20° C.
Figure 5:
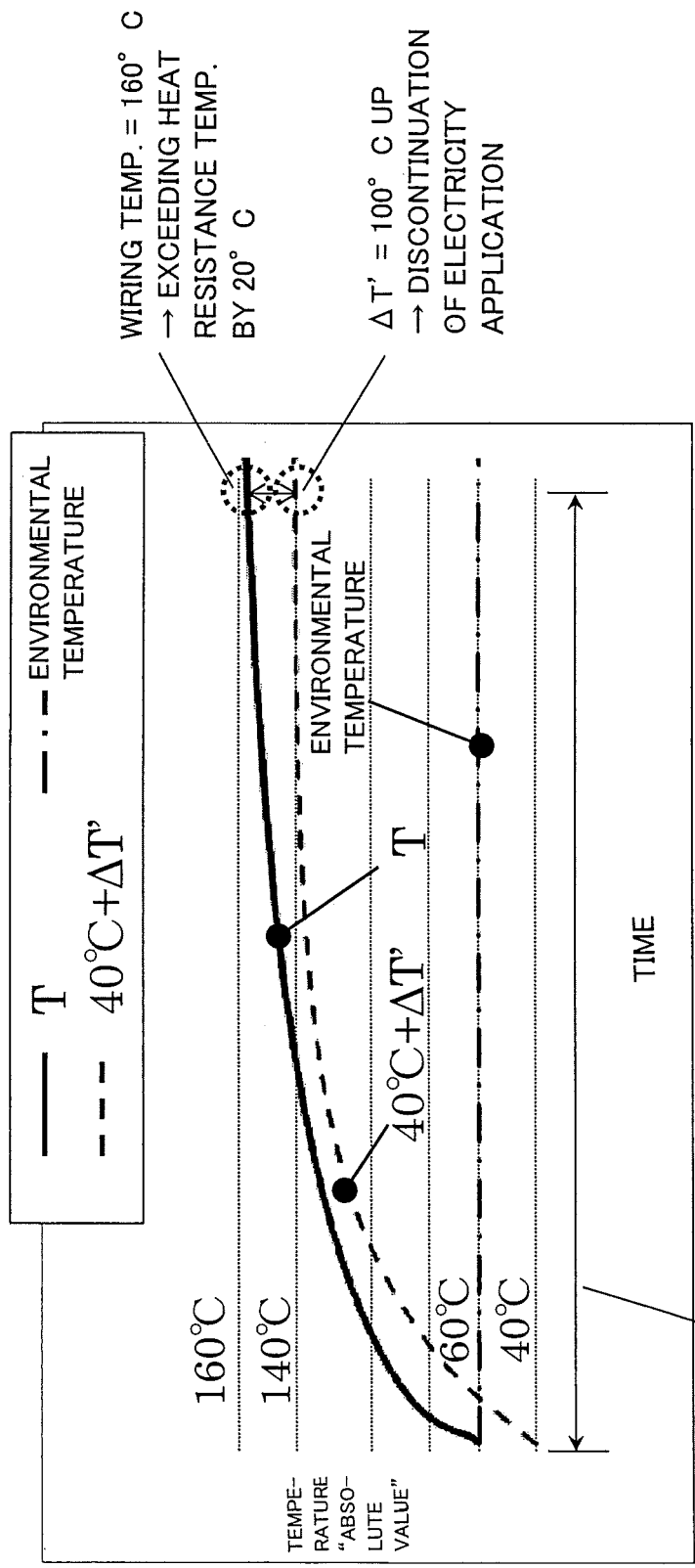
FIG. 5 is a diagram showing a relationship between an estimated value ΔT' of the change of the wiring temperature calculated by the circuit of FIG. 2 and an actual change ΔT of the wiring temperature when the environmental temperature is 60° C.
Figure 6:
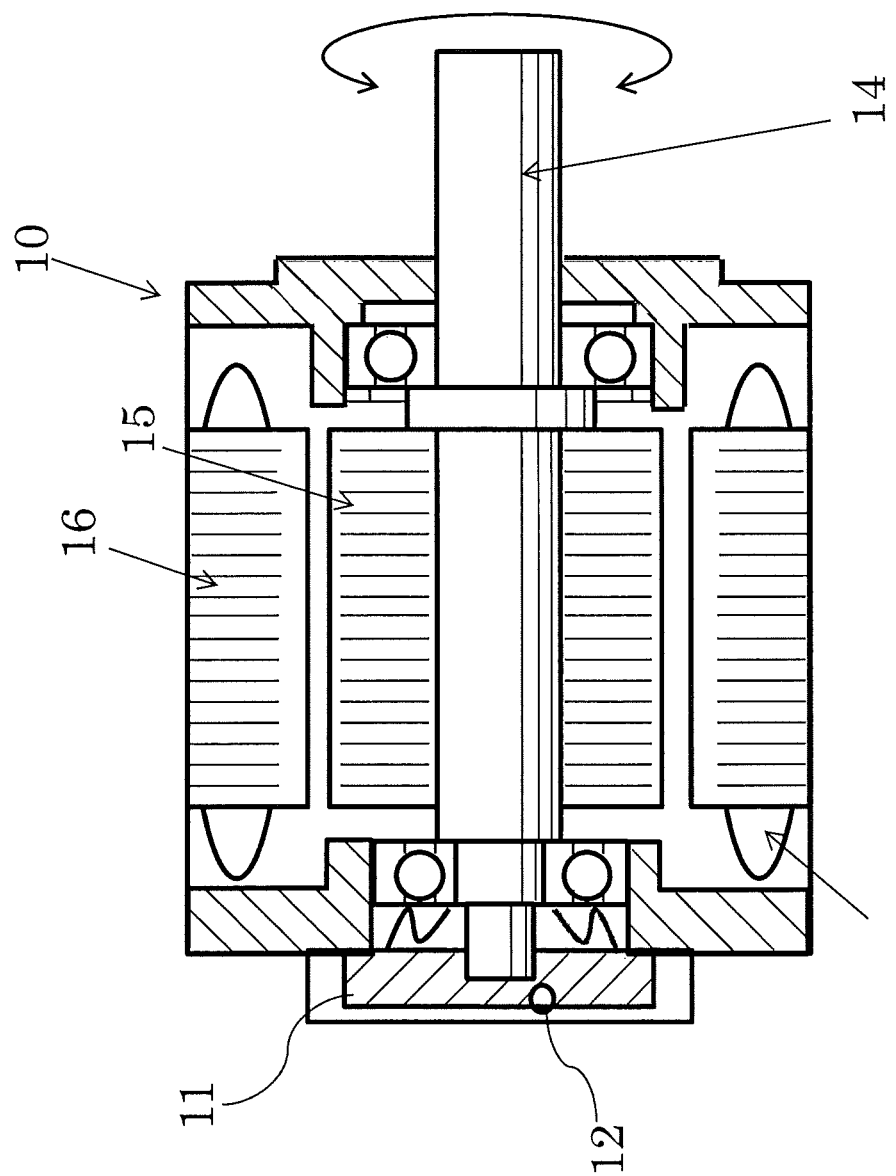
FIG. 6 is a structural diagram of a motor according to a preferred embodiment of the present invention.

A preferred embodiment of the present invention will now be described. FIG. 6 shows a structure of a motor 10 according to a preferred embodiment of the present invention. The motor 10 comprises a rotor 15, and a stator 16 placed in a manner to surround the rotor 15. The rotor 15 is integral with an output shaft 14, and is rotatable with respect to the stator 16. At an end of the motor 10, a detector 11 which detects a rotational position and/or a rotational speed of the rotor 15 is provided. On the detector 11, a detector temperature detection element 12 is provided for detecting a temperature of the detector 11 itself. In the motor 10, no wiring temperature detection element which detects the temperature of wiring (for example, a coil end 13) wound around the stator 16 is provided.

Figure 7:
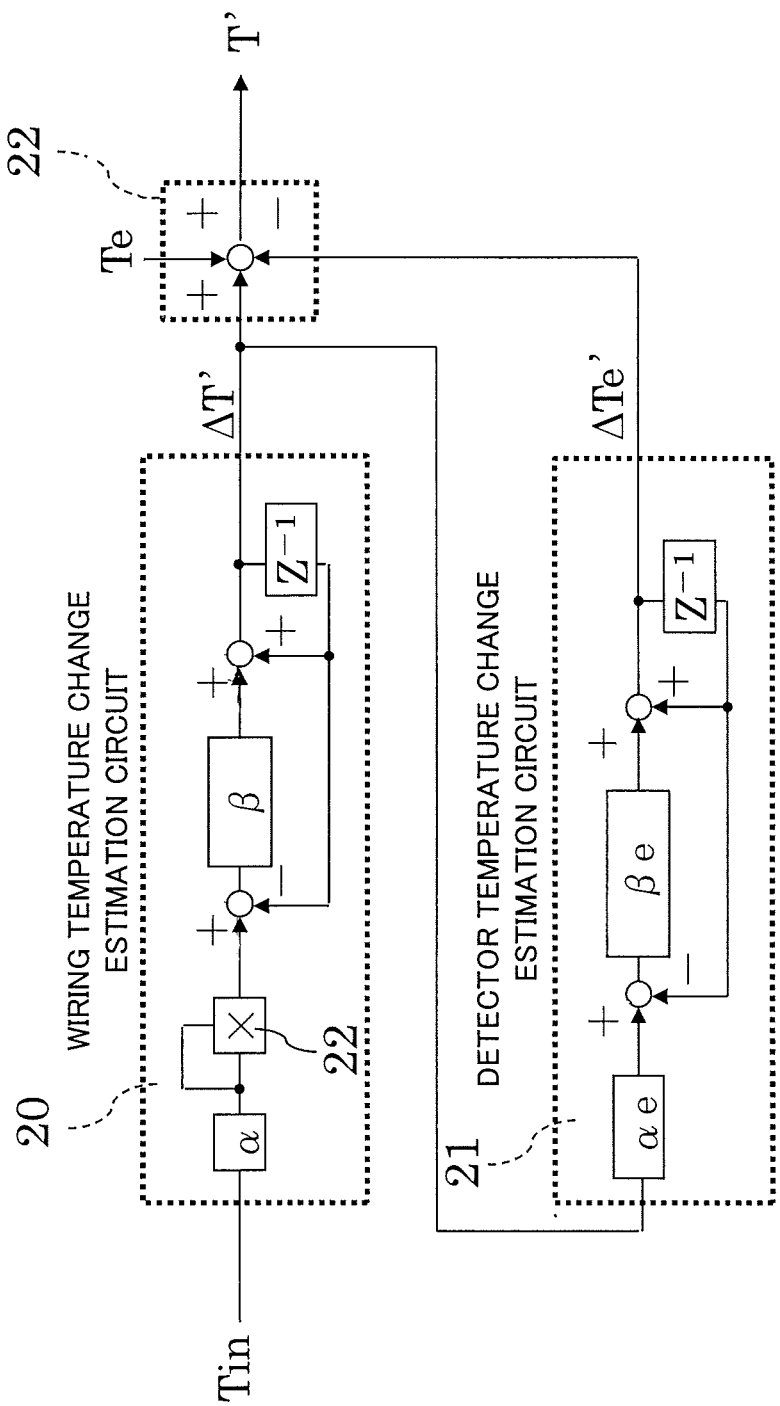
FIG. 7 is a functional block diagram of a circuit which estimates an absolute value of the wiring temperature according to a preferred embodiment of the present invention.

FIG. 7 is a block diagram showing a circuit structure of relevant portions of the motor control apparatus according to the present embodiment. This circuit outputs an estimated value T' of the wiring temperature based on a value Tin related to a current supplied to the motor 10 and an absolute value Te of the temperature of the detector 11 measured by the detector temperature detection element 12. The circuit comprises a wiring temperature change estimation circuit 20, a detector temperature change estimation circuit 21, and a wiring temperature absolute value estimation circuit 22. These circuits 20, 21, and 22 may be hardware structures which realize the functions shown in the figures, or may be software structures which realize the functions shown in the figures according to a predetermined program.

The wiring temperature change estimation circuit 20 calculates an estimated value ΔT' of the change of the wiring temperature according to Equation 1 described above. In the present specification, a "change" refers to an amount of change with respect to an initial value which is a value at the time of starting of an operation of the motor.

$$\Delta T'(n)=\beta \times \{(\alpha \times Tin)2-\Delta T'(n-1)\}+\Delta T'(n-1) \quad \text{(Equation 1)}$$

wherein

ΔT': estimated value of change of wiring temperature,

α: coefficient which determines a saturated value of the estimated value of the change of the wiring temperature, β: coefficient which determines a time constant of the estimated value of the change of the wiring temperature, Tin: value related to current, and index (n): number of detection periods.

The detector temperature change estimation circuit 21 calculates an estimated value ΔTe' of the change of the detector temperature according to Equation 2 described below:

$$\Delta Te'(n)=\beta e \times (\alpha e \times \Delta T'(n)-\Delta Te'(n-1))+\Delta Te'(n-1) \quad \text{(Equation 2)}$$

Here, αe represents a coefficient which determines a saturated value of the estimated value of the change of the detector temperature, and βe represents a coefficient which determines a time constant of the estimated value of the change of the detector temperature. The index (n) represents a number of detection periods. Equation 2 is an equation for calculating the estimated value ΔTe' (n) of the change of the detector temperature at an nth detection period based on the estimated value ΔTe'(n−1) of the change of the detector temperature at an (n−1)th detection period and the estimated value ΔT'(n) of the change of the wiring temperature of the nth detection period.

The wiring temperature absolute value estimation circuit 22 calculates an estimated value T' of the absolute value of the wiring temperature based on Equation 3:

$$T'=\Delta T'+(Te-\Delta Te') \quad \text{(Equation 3)}$$

Here, T' represents an estimated value of the absolute value of the wiring temperature, ΔT' represents the estimated value of the change of the wiring temperature calculated based on Equation 1, Te represents an absolute value of the temperature of the detector 11 measured by the detector temperature detection element 12, and ΔTe' represents an estimated value of the change of the detector temperature calculated based on Equation 2.

The idea behind this model will now be described.

As a presumption, the detector itself does not generate heat in connection with driving and non-driving of the motor. The temperature of the detector changes as the heat is generated in the wiring, the wiring temperature is increased, and the heat is gradually conducted to the detector. Because of this, ΔT'(n) which is the change of the wiring temperature is taken as an input, and the change of the detector temperature is calculated.

Figure 8:
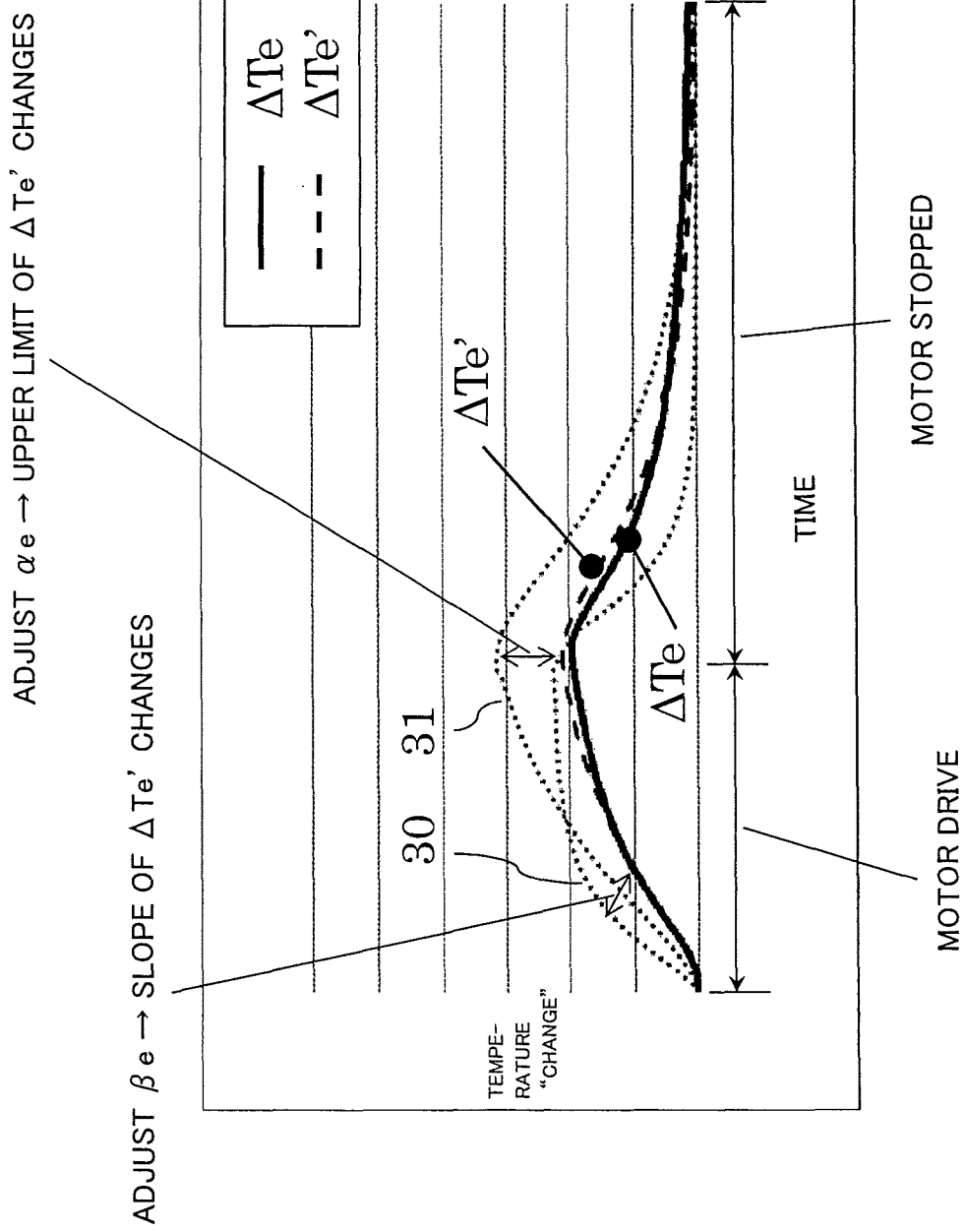
FIG. 8 is a diagram showing a relationship between an estimated value ΔTe' of a change of a detector temperature calculated by a circuit of a preferred embodiment of the present invention and an actual change ΔTe of the detector temperature.

A relationship between the estimated value ΔTe' of the change of the detector temperature determined by Equation 2 and the actual change ΔTe of the detector temperature is shown in FIG. 8. When βe is adjusted, a slope of ΔTe' changes as shown by reference numeral 30, and when αe is adjusted, an upper limit value of ΔTe' changes as shown by reference numeral 31. By adjusting these two parameters, it becomes possible to calculate the estimated value fitted to the thermal characteristic of the detector 11.

An environmental temperature can be determined by subtracting ΔTe' calculated by Equation 2 from Te which is the absolute value of the temperature of the detector 11 measured by the detector temperature detection element 12. This is shown in Equation 3 as a term (Te−ΔTe'). Thus, the wiring temperature absolute value estimation circuit 22 is a circuit which calculates the environmental temperature. By adding this value to ΔT', the estimated value T' of the absolute value of the wiring temperature is calculated. In the calculation of the estimated value T' of the absolute value of the wiring temperature, the environmental temperature is taken into consideration, and it becomes possible to evaluate the wiring temperature not as a change from the initial value, but rather, as an absolute value.

Figure 9:
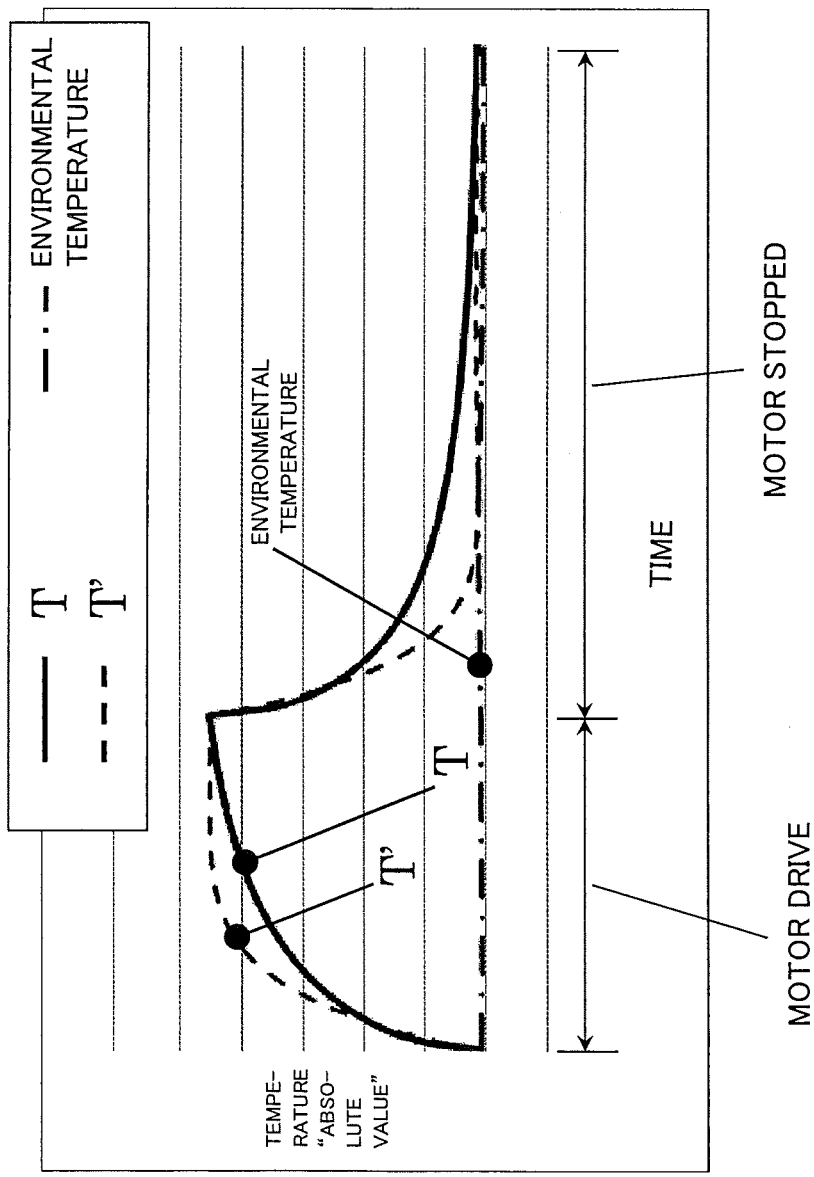
FIG. 9 is a diagram showing a relationship between an estimated value T' of the absolute value of the wiring temperature calculated by a circuit of a preferred embodiment of the present invention and an actual wiring temperature T.

A relationship between T' which is an estimated value and the actual value T of the absolute value of the wiring temperature is shown in FIG. 9.

In the above-described embodiment, a case is described in which the estimated value ΔT' of the change of the wiring temperature is calculated by the method of Equation 1, but the calculation method of the estimated value ΔT' is not limited to Equation 1. Equation 1 estimates the change of the wiring temperature considering only the amount of heat generation by copper loss. However, during driving of the motor, in addition to the copper loss, iron loss and mechanical loss also affect the change of the wiring temperature. Therefore, in order to more accurately estimate the change of the wiring temperature, a method may be employed in which the estimated value ΔT' of the change of the wiring temperature is calculated also in consideration of these factors.

What is claimed is:

1. A control apparatus of a motor, comprising:
   a detector that detects a rotational position and/or a rotational speed of a rotor of a motor, and that has a temperature detection element that detects a temperature of the detector;
   a circuit that estimates a change of a wiring temperature, to calculate an estimated value of the change of the wiring temperature;
   a circuit that estimates a change of a detector temperature based on the estimated value of the change of the wiring temperature, to calculate an estimated value of the change of the detector temperature;
   a circuit that subtracts the estimated value of the change of the detector temperature from an absolute value of the detector temperature detected by the temperature detection element, to calculate an environmental temperature; and
   a circuit that adds the obtained environmental temperature to the estimated value of the change of the wiring temperature, to calculate an estimated value of an absolute value of the wiring temperature.

2. The control apparatus of motor according to claim 1, wherein
   the circuit that calculates the estimated value of the change of the wiring temperature is a circuit that calculates, based on an estimated value of the change of the wiring temperature at a certain detection period and a value related to a current supplied to the motor, an estimated value of the change of the wiring temperature at a next detection period, and
   the circuit that calculates the estimated value of the change of the detector temperature is a circuit that calculates, based on an estimated value of the change of the detector temperature at a certain detection period and an estimated value of the change of the wiring temperature at a next detection period, an estimated value of the change of the detector temperature at the next detection period.

3. The control apparatus of motor according to claim 2, wherein
   the circuit that calculates the estimated value of the change of the wiring temperature calculates the estimated value of the change of the wiring temperature based on an equation:

$$\Delta T'_{(n)}=\beta \times \{(\alpha \times Tin)^2-\Delta T'_{(n-1)}\}+\Delta T'_{(n-1)}$$

wherein:
   ΔT' represents the estimated value of the change of the wiring temperature;
   α represents a coefficient that determines a saturated value of the estimated value of the change of the wiring temperature;
   β represents a coefficient that determines a time constant of the estimated value of the change of the wiring temperature;
   Tin represents a command value or a detected value of a current, or a torque command value; and
   an index $_{(n)}$ represents a number of detection periods, and
   the circuit that obtains the estimated value of the change of the detector temperature calculates the estimated value of the change of the detector temperature based on an equation:

$$\Delta Te'_{(n)}=\beta e \times (\alpha e \times \Delta T'_{(n)}-\Delta Te'_{(n-1)})+\Delta Te'_{(n-1)}$$

wherein:
   ΔTe' represents the estimated value of the change of the detector temperature;

αe represents a coefficient that determines a saturated value of the estimated value of the change of the detector temperature;

βe represents a coefficient that determines a time constant of the estimated value of the change of the detector temperature; and an index $_{(n)}$ represents a number of detection periods.

* * * * *